United States Patent
Hutchison

(10) Patent No.: US 9,539,662 B2
(45) Date of Patent: Jan. 10, 2017

(54) EXTRACTION OF ARC LENGTH FROM VOLTAGE AND CURRENT FEEDBACK

(71) Applicant: Illinois Tool Works Inc., Glenview, IL (US)

(72) Inventor: Richard Martin Hutchison, Iola, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 349 days.

(21) Appl. No.: 14/067,432

(22) Filed: Oct. 30, 2013

(65) Prior Publication Data

US 2015/0114940 A1    Apr. 30, 2015

(51) Int. Cl.
| | |
|---|---|
| B23K 9/09 | (2006.01) |
| B23K 9/10 | (2006.01) |
| B23K 9/095 | (2006.01) |
| B23K 9/12 | (2006.01) |
| B23K 9/173 | (2006.01) |

(52) U.S. Cl.
CPC ............. *B23K 9/1062* (2013.01); *B23K 9/091* (2013.01); *B23K 9/0953* (2013.01); *B23K 9/0956* (2013.01); *B23K 9/125* (2013.01); *B23K 9/173* (2013.01)

(58) Field of Classification Search
CPC ..... B23K 9/0953; B23K 9/1043; B23K 9/095; B23K 9/10; B23K 9/12; B23K 9/173; B23K 9/0735
USPC ............. 219/130.21, 130.33, 137 PS, 124.02
See application file for complete search history.

(56) References Cited

U.S. PATENT DOCUMENTS

| | | | |
|---|---|---|---|
| 4,631,385 A | 12/1986 | Rothermel | |
| 5,043,557 A | 8/1991 | Tabata | |
| 5,756,967 A | 5/1998 | Quinn | |
| 6,002,104 A | 12/1999 | Hsu | |
| 6,248,976 B1 * | 6/2001 | Blankenship | ........ B23K 9/0953 219/130.21 |
| 6,624,388 B1 * | 9/2003 | Blankenship | ........ B23K 9/1062 219/130.5 |
| 6,958,263 B2 | 10/2005 | Bhattacharyya | |
| 7,145,101 B2 | 12/2006 | Tong | |
| 8,203,100 B2 | 6/2012 | Ueda | |
| 2006/0163229 A1 * | 7/2006 | Hutchison | .............. B23K 9/091 219/130.21 |

FOREIGN PATENT DOCUMENTS

| | | |
|---|---|---|
| CA | 2072711 | 12/1992 |
| CN | 1496774 | 5/2004 |
| CN | 1836818 | 9/2006 |
| CN | 101376191 | 3/2009 |

(Continued)

OTHER PUBLICATIONS

International Search Report from PCT application No. PCT/US2014/045872, dated Nov. 4, 2014, 10 pgs.

*Primary Examiner* — Brian Jennison
(74) *Attorney, Agent, or Firm* — Fletcher Yoder P.C.

(57) ABSTRACT

A method of controlling a welding system includes controlling a weld current supplied to an electrode at a current ramp rate and determining an arc length based at least in part on the controlled weld current and a changing arc voltage. The arc length includes a distance between the electrode and a workpiece, and the arc voltage includes a voltage between the electrode and the workpiece.

19 Claims, 8 Drawing Sheets

(56) References Cited

FOREIGN PATENT DOCUMENTS

| | | |
|---|---|---|
| EP | 0387223 | 9/1990 |
| EP | 2218537 | 8/2010 |
| JP | H07204848 | 8/1995 |
| SU | 872102 | 10/1981 |

* cited by examiner

EXTRACTION OF ARC LENGTH FROM VOLTAGE AND CURRENT FEEDBACK

BACKGROUND

The invention relates generally to welding systems, and particularly to control of a welding system for gas-metal arc welding (GMAW), also known as metal inert gas (MIG) welding systems.

Arc welding systems generally comprise a power supply that applies electrical current to an electrode so as to pass an arc between the electrode and a workpiece, thereby heating the electrode and the workpiece to create a weld. In many systems, such as gas metal arc welding systems (GMAW), the electrode consists of a wire which is advanced through a welding torch. As the electrode is heated by the arc, the electrode melts and is joined to molten metal of the work piece to form the weld.

Advanced forms of MIG welding are based upon generation of pulsed power in the welding power supply, which may be known as pulsed gas metal arc welding (GMAW-P). That is, various pulsed regimes may be carried out in which current pulses and/or voltage pulses are commanded by the power supply control circuitry to regulate the formation and deposition of metal droplets from the welding wire, to sustain a desired heating and cooling profile of the weld pool, to control shorting between the wire and the weld pool, and so forth.

By controlling the supply of voltage and current to the electrode, a GMAW system may control the manner in which the electrode is melted and deposited by the arc. Controlling the arc length between the electrode and the workpiece may affect the energy applied and/or how the electrode is deposited by the arc. Some GMAW systems may attempt to maintain a constant arc length by controlling the weld voltage supplied to the torch. However, an arc voltage across the arc length may be only a part of the weld voltage between the torch and the workpiece.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method of controlling a welding system includes controlling a weld current supplied to an electrode at a current ramp rate and determining an arc length based at least in part on the controlled weld current and a changing arc voltage. The arc length includes a distance between the electrode and a workpiece, and the arc voltage includes a voltage between the electrode and the workpiece.

In another embodiment, a welding system includes power conversion circuitry configured to provide a pulse welding waveform to a torch, one or more sensors, and processing circuitry coupled to the one or more sensors. The pulse welding waveform includes a peak portion, which includes a ramp up portion or a ramp down portion. The one or more sensors are configured to sense a weld voltage of the pulse welding waveform and a weld current of the pulse welding waveform applied to an electrode within the torch. The processing circuitry is configured to determine an arc length based at least in part on changes to the weld current and changes to the weld voltage during the ramp up portion or the ramp down portion. The arc length includes a distance between the electrode and a workpiece.

In another embodiment, a method of controlling a welding system includes sensing a changing weld current and a changing voltage of a pulse welding waveform, determining a resistance of an electrode based at least in part on the changing current and the changing voltage, determining an arc voltage based at least in part on a weld voltage, the resistance, and a fall voltage, and controlling an arc length during the pulse welding waveform based at least in part on a functional relationship between the arc length and the arc voltage. The arc length includes a distance between the electrode and the workpiece.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of GMAW systems as described herein may control the arc length between an electrode and a workpiece based at least in part on sensed changes in the weld current and weld voltage supplied to the electrode. Control circuitry of the GMAW system (e.g., pulsed GMAW system) may determine the arc length from sensed voltages and currents during a change to or from a pulse peak. The weld voltage supplied to the electrode has multiple components, such as voltage across the electrode, a fall voltage, and an arc voltage across the arc length. The arc voltage may be directly related to the arc length. The control circuitry utilizes changes in the observed weld current and the weld voltage (e.g., during a ramp up or ramp down of a pulse) with test data corresponding to various arc parameters to determine the arc voltage via subtracting the effects of the other components from the weld voltage. The control circuitry may determine the electrode resistance from the sensed voltage and current during the ramp up or ramp down portion of a pulse to determine the voltage across the electrode. Using the test data and observed weld current and weld voltage, the control circuitry may determine the fall voltage, the arc voltage, and the arc length. The control circuitry may compare the determined arc length to an arc length setting, and control the power supply and/or the wire feeder to adjust arc parameters that affect the arc length based at least in part on a difference between the determined arc length and the arc length setting. Accordingly, the control circuitry may determine arc length and control the arc length in a closed-loop control.

Figure 1:
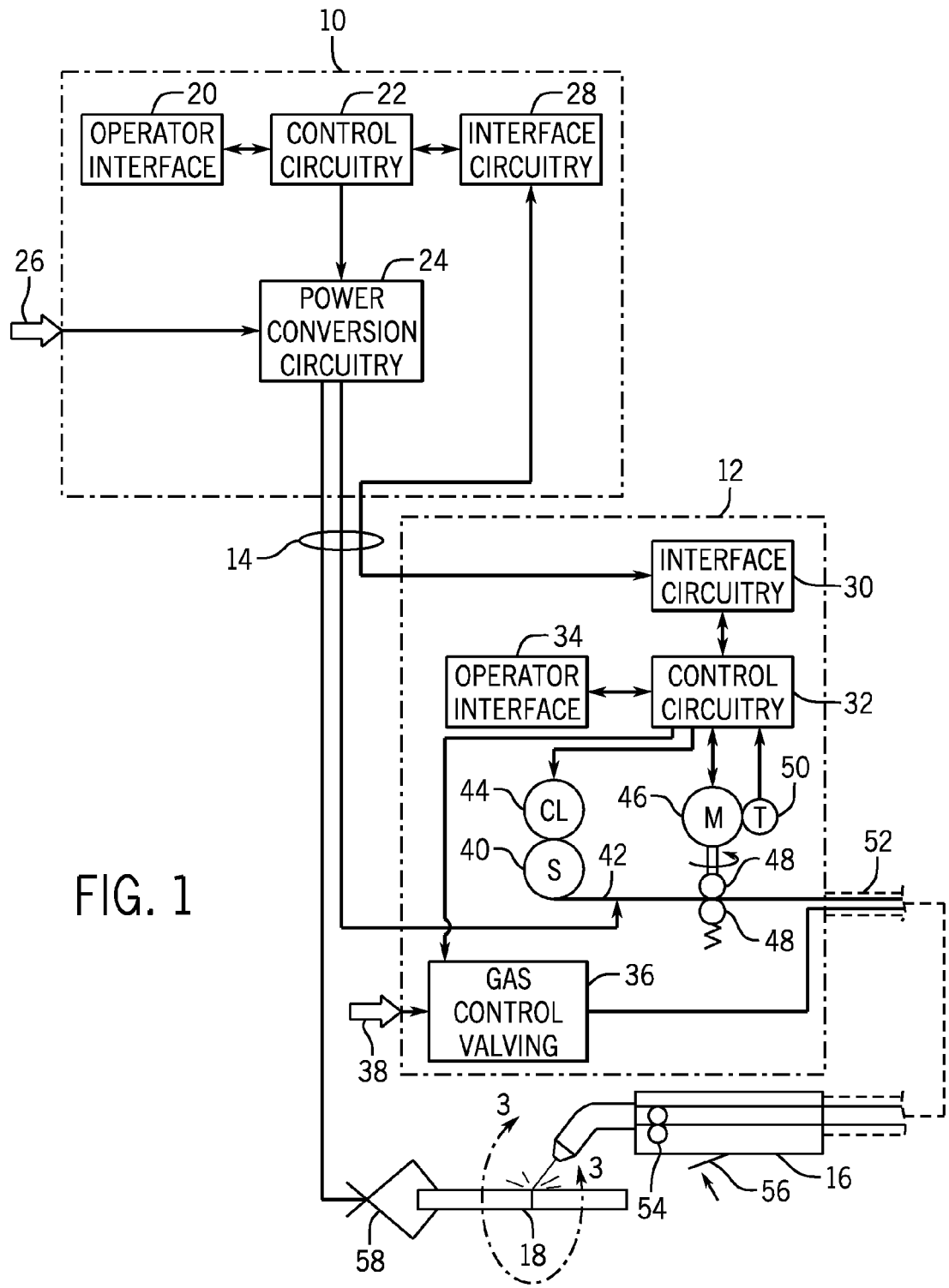
FIG. 1 is an embodiment of a GMAW system illustrating a power supply coupled to a wire feeder for performing welding operations in accordance with aspects of the present techniques.

Turning now to the drawings, and referring first to FIG. 1, a welding system is illustrated as including a power supply 10 and a wire feeder 12 coupled to one another via conductors or conduits 14. In the illustrated embodiment the power supply 10 is separate from the wire feeder 12, such that the wire feeder 12 may be positioned at some distance from the power supply 10 near a welding location. However, it should be understood that the wire feeder 12, in some implementations, may be integral with the power supply 10. In such cases, the conduits 14 would be internal to the system. In embodiments in which the wire feeder 12 is separate from the power supply 10, terminals are typically provided on the power supply 10 and on the wire feeder 12 to allow the conductors or conduits 14 to be coupled to the systems so as to allow for power and gas to be provided to the wire feeder 12 from the power supply 10, and to allow data to be exchanged between the two devices.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor (e.g., clamp 58) is typically run to the welding workpiece 18 so as to complete an electrical circuit between the power supply 10 and the workpiece 18.

The system is designed to allow for data settings (e.g., weld parameters, arc length) to be selected by the operator, particularly via an operator interface 20 provided on the power supply 10. The operator interface 20 will typically be incorporated into a front faceplate of the power supply 10, and may allow for selection of settings. Weld parameters may include arc parameters and system parameters as discussed below. System parameters may include background and peak currents and voltages, pulse frequency, pulse period, and so forth. Arc parameters may include electrode size, type, and material, wire feed rate, shielding gas composition, and so forth. In particular, the welding system is designed to allow for MIG welding with various steels, aluminums, or other welding wire that is channeled through the torch 16. These weld parameters are communicated to control circuitry 22 within the power supply 10. The system may be particularly adapted to implement welding regimes designed for certain electrode types, such as solid and/or cored electrodes.

The control circuitry 22, described in greater detail below, operates to control generation of welding power output from the power supply 10 that is applied to the welding wire for carrying out the desired welding operation. In certain presently contemplated embodiments, for example, the control circuitry 22 may be adapted to regulate a GMAW-P regime that maintains a substantially constant arc length between the tip of the welding wire and the workpiece 18. For example, the control circuitry 22 may maintain the arc length within a threshold length of an arc length setting. The threshold length may be within approximately 1, 5, or 10 percent of the arc length setting. The control circuitry 22 may determine the arc length during a pulse waveform provided to the torch 16, and control the arc length during the same pulse waveform or a subsequent pulse waveform via a closed-loop control system. The control circuitry 22 may determine the arc length as described herein from sensed voltages and currents of the pulsed waveform without altering (e.g., inducing perturbations) the pulse waveform for measurement purposes. Moreover, in some embodiments, the control circuitry 22 may determine the arc length during a ramp up and prior to controlling the pulse waveform to a peak value. The control circuitry 22 may sense the voltage between the torch 16 and the workpiece 18, and determine the arc voltage and arc length based at least in part on one or more of a voltage change across the welding wire, a cathode fall voltage, and an anode fall voltage. In some embodiments, the control circuitry 22 may direct the power supply 10 to provide pulse waveforms to promote short circuit transfer of molten metal to a progressing weld puddle, while maintaining a substantially constant arc length during peak portions of the pulsed waveform.

In "short circuit" modes, droplets of molten material form on the welding wire under the influence of heating by the welding arc, and these are periodically transferred to the weld pool by contact or short circuits between the wire and droplets and the weld pool. "Pulsed welding" or "pulsed MIG welding" refers to techniques in which a pulsed power waveform is generated, such as to control deposition of droplets of metal into the progressing weld puddle. As discussed herein, the pulsed waveforms generated by power conversion circuitry 24 and controlled by the control circuitry 22 may be utilized for various GMAW transfer modes, including, but not limited to, short-circuit transfer (e.g., regulated metal deposition (RMD™)), globular transfer, spray transfer, and pulsed spray, or any combination thereof.

The control circuitry 22 is thus coupled to power conversion circuitry 24. This power conversion circuitry 24 is adapted to create the output power, such as pulsed waveforms that will ultimately be applied to the welding wire at the torch 16. Various power conversion components may be employed within the power conversion circuitry 24, including, but not limited to, choppers, boost circuitry, buck circuitry, inverters, converters, transformers, and so forth. The configuration of such power conversion circuitry 24 may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply 10 illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components 28, 30 and a multi-conductor cable run between the respective interface circuitry to allow for such information as wire feed speeds, processes, selected currents, voltages, arc lengths, or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply 10 via the interface circuitry 30. The control circuitry 32 is coupled to an operator interface 34 on the wire feeder 12 that allows selection of one or more weld parameters, particularly wire feed speed. The operator interface 34 may also allow for selection of such weld parameters as the process, the type of wire utilized, current, voltage, arc length, or power settings, and so forth. The control circuitry 32 is also coupled to gas control valving 36 which regulates the flow of shielding gas to the torch 16. In general, such gas is provided at the time of welding, and may be turned on immediately preceding the weld and/or for a short time following the weld. The gas supplied to the gas control valving 36 is typically provided in the form of pressurized bottles, as represented by reference numeral 38.

The wire feeder 12 includes components for feeding wire to the welding torch 16 and thereby to the welding application, under the control of control circuitry 36. For example, one or more spools 40 of welding wire are housed in the wire feeder 12. Welding wire 42 is unspooled from the spools 40 and is progressively fed to the torch 16. The spool 40 may be associated with a clutch 44 that disengages the spool 40 when wire 42 is to be fed to the torch 16. The clutch 44 may also be regulated to maintain a minimum friction level to avoid free spinning of the spool 40. A feed motor 46 is provided that engages with feed rollers 48 to push wire 42 from the wire feeder 12 towards the torch 16. In practice, one of the rollers 48 is mechanically coupled to the feed motor 46 and is rotated by the feed motor 46 to drive the wire 42 from the wire feeder 12, while the mating roller 48 is biased towards the wire 42 to maintain good contact between the two rollers 48 and the wire 42. Some systems may include multiple rollers 48 of this type. Finally, a tachometer 50 may be provided for detecting the speed of the motor 46, the rollers 48, or any other associated component so as to provide an indication of the actual wire feed speed. Signals from the tachometer 50 are fed back to the control circuitry 36, such as for calibration.

It should be noted that other system arrangements and input schemes may also be implemented. For example, the welding wire 42 may be fed from a bulk storage container (e.g., a drum) or from one or more spools 40 outside of the wire feeder 12. Similarly, the wire 42 may be fed from a "spool gun" in which the spool 40 is mounted on or near the welding torch 16. As noted herein, the wire feed speed settings may be input via the operator input 34 on the wire feeder 12 or on the operator interface 20 of the power supply 10, or both. In systems having wire feed speed adjustments on the welding torch 16, this may be the input used for the setting.

Power from the power supply 10 is applied to the wire 42, typically by means of a welding cable 52 in a conventional manner. Similarly, shielding gas is fed through the wire feeder 12 and the welding cable 52. During welding operations, the wire 42 is advanced through the welding cable jacket towards the torch 16. Within the torch 16, an additional pull motor 54 may be provided with an associated drive roller, particularly for aluminum alloy welding wires. A trigger switch 56 on the torch 16 provides a signal that is fed back to the wire feeder 12 and therefrom back to the power supply 10 to enable the welding process to be started and stopped by the operator. That is, upon depression of the trigger switch 56, gas flow is begun, wire 42 is advanced, power is applied to the welding cable 52 and through the torch 16 to the advancing welding wire. These processes are also described in greater detail below. Finally, a workpiece cable and clamp 58 allow for closing an electrical circuit from the power supply through the welding torch, the electrode (wire), and the workpiece for maintaining the welding arc during operation.

Figure 2:
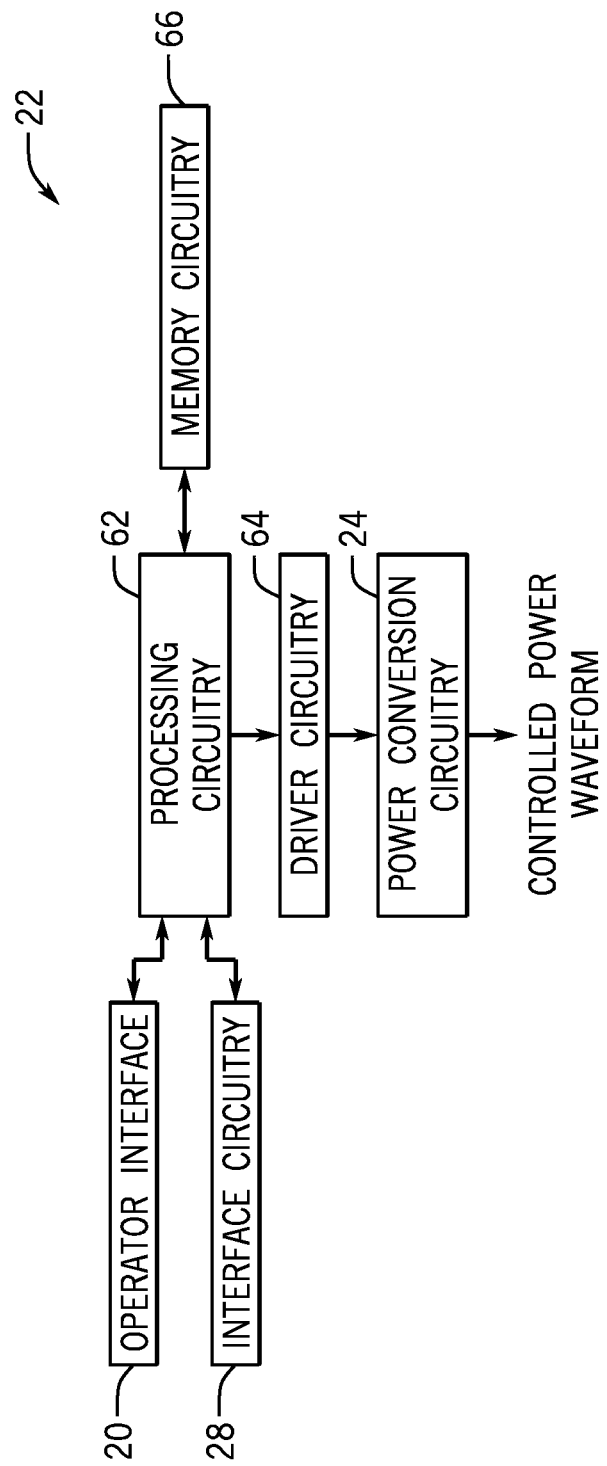
FIG. 2 is an embodiment of control circuitry components for a welding power supply of the type shown in FIG. 1.

FIG. 2 illustrates an exemplary embodiment for the control circuitry 22 designed to function in a system of the type illustrated in FIG. 1. The control circuitry 22 includes the operator interface 20 discussed above and interface circuitry 28 for communication of parameters to and from downstream components such as a wire feeder 12, a welding torch 16, and various sensors and/or actuators. The control circuitry 22 includes processing circuitry 62, which itself may comprise one or more application-specific or general purpose processors, designed to carry out welding regimes, make computations for waveforms implemented in welding regimes, and so forth. The processing circuitry 62 is associated with driver circuitry 64 which converts control signals from the processing to drive signals that are applied to power electronic switches of the power conversion circuitry 24. In general, the driver circuitry 64 reacts to such control signals from the processing circuitry 62 to allow the power conversion circuitry 24 to generate controlled waveforms for welding regimes of the type described in the present disclosure. The processing circuitry 62 will also be associated with memory circuitry 66 which may consist of one or more types of permanent and temporary data storage, such as for providing the welding regimes implemented, storing welding parameters, storing weld settings, storing error logs, and so forth.

Figure 3:
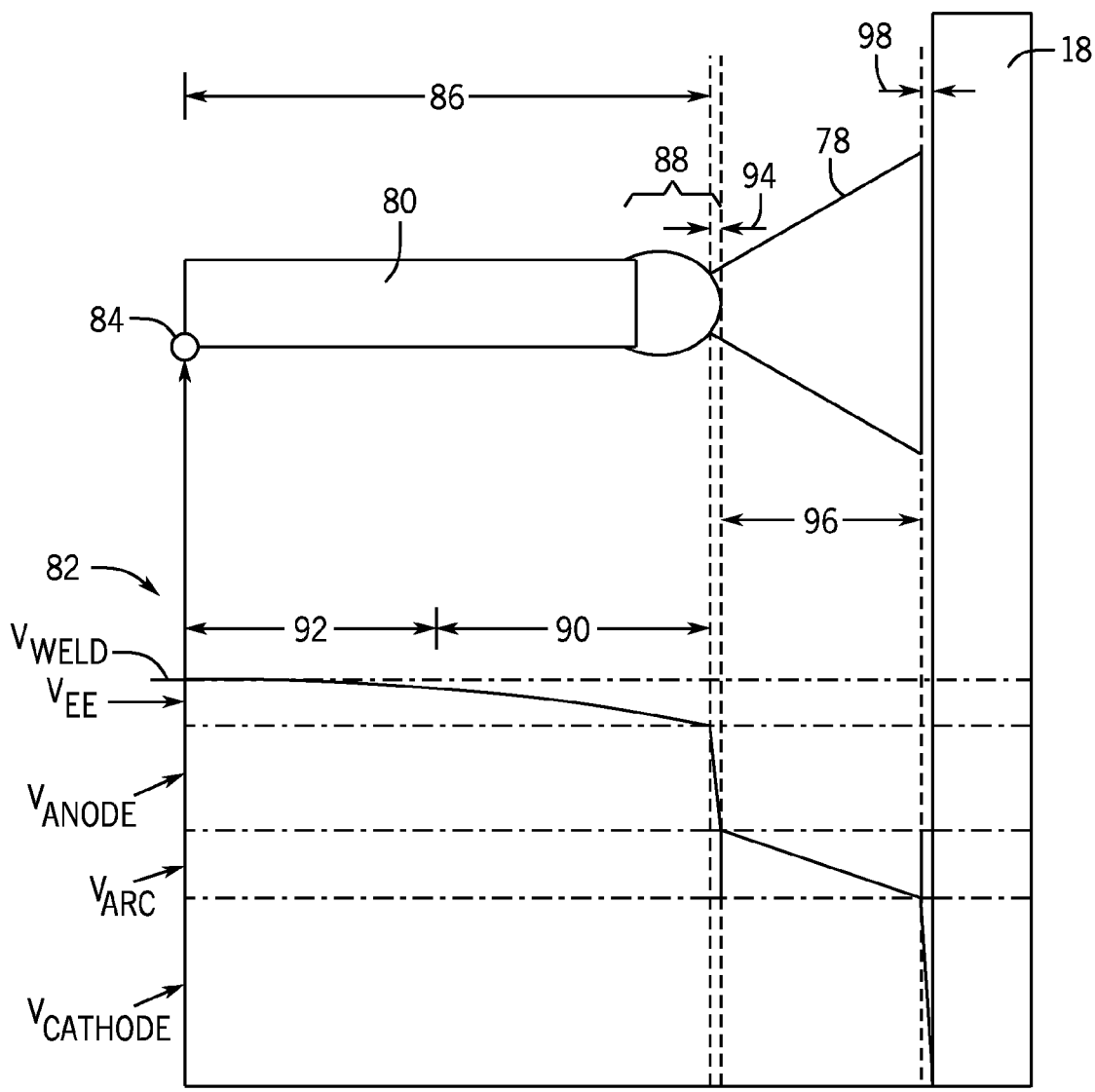
FIG. 3 is an embodiment of a welding arc between the electrode and workpiece, taken along line 3-3 of the GMAW system of FIG. 1.

FIG. 3 is an embodiment of a welding arc 78 between the electrode 80 and workpiece 18, taken along line 3-3 of the GMAW system of FIG. 1. A graph 82 illustrates the voltage between a contact point 84 in the torch 16 and the workpiece 18. As may be appreciated, the electrode 80 is an end of the welding wire 42 extending from the torch 16 that carries the pulsed waveform from the power supply 10. The torch 16 provides the pulsed waveform to the electrode 80 at the contact point 84. In some embodiments, the contact point 84 includes a sensor coupled to the control circuitry 22 to provide current and/or voltage feedback. The pulsed waveform has a voltage component and a current component, and one or both components may be controlled by the power conversion circuitry 24 via the control circuitry 22. At the contact point 84, the pulsed waveform is applied to the electrode 80 with a weld voltage ($V_{weld}$) with respect to the workpiece 18. For example, during a peak portion of the pulsed waveform, $V_{weld}$ may be approximately a peak voltage set via the operator interface 20. During a background portion of the pulsed waveform, $V_{weld}$ may be approximately a background voltage set via the operator interface 20. The voltage across the electrode ($V_{EE}$) varies along the electrode 80 towards the workpiece 18 based at least in part on the resistance of the electrode 80, a length 86 (e.g., electrode extension) of the electrode 80 between the contact point 84 and a tip 94 of the electrode 80, or a temperature of the electrode 80, or any combination thereof. In some embodiments, $V_{EE}$ changes in an approximately linear relationship with the length 86. In some embodiments, as shown in FIG. 3, $V_{EE}$ decreases more in a first portion 90 proximate to an end portion 88 than a second portion 92 proximate to the contact point 84. For example, the first portion 90 of the electrode 80 may be warmer and have a greater resistance than the second portion 92.

During the welding process, the tip 94 of the end portion 88 may be herein characterized as an anode. In some embodiments, the tip 94 is less than approximately 5, 10, 20, or 50 microns across. An anode voltage ($V_{anode}$) may be based at least in part on the type of electrode 80 (e.g., solid, cored), the electrode material, diameter of the electrode 80, electrode feed rate, or shielding gas, or any combination thereof. In some embodiments, $V_{anode}$ may be substantially independent with respect to the weld current through the tip 94. The arc 78 extends across an arc length 96 (e.g., $l_{arc}$) between the tip 94 and a surface region 98 of the workpiece 18. The surface region 98 may be herein characterized as a cathode. In some embodiments, the surface region 98 is less than approximately 5, 10, 20, or 50 microns across. A cathode voltage ($V_{cathode}$) may be based at least in part on the material of the workpiece 18, the type of joint, the electrode feed rate, or shielding gas, or any combination thereof. In some embodiments, $V_{cathode}$ may be substantially independent with respect to the weld current through the surface region 98. $V_{anode}$ and $V_{cathode}$ together may be referred to as fall voltage ($V_{fall}$) herein, and each may be substantially independent with respect to the weld current.

As shown in FIG. 3, the weld voltage $V_{weld}$ includes multiple components as shown in Equation (1):

$$V_{weld} = V_{EE} + V_{anode} + V_{arc} + V_{cathode} \qquad \text{Equation (1)}$$

In some embodiments, $V_{arc}$ is less than approximately 10, 15, 20, or 25 percent of $V_{weld}$. For example, in an embodiment with a 0.045 inch mild steel electrode fed at 400 inches per minute, a 90-10 Argon-$CO_2$ shielding gas mixture, 0.75 inches electrode extension, and 0.2 inch arc length during a peak pulse, $V_{weld}$=32 V, $V_{EE}$=9 V, $V_{fall}$=18 V, and $V_{arc}$=5 V. The arc length 96 ($l_{arc}$) may be directly related to the arc voltage ($V_{arc}$) across the $l_{arc}$ 96. Presently contemplated embodiments of the control circuitry 22 may determine $V_{arc}$ during a pulsed waveform, and utilize the determined $V_{arc}$ to control $V_{weld}$ and adjust $l_{arc}$ 96 via adjustments to the pulsed waveform. In some embodiments, the control circuitry 22 determines $V_{arc}$ dynamically during the pulsed welding operation for control of the arc length 96 ($l_{arc}$) of present and/or subsequent pulsed waveforms.

Figure 4:
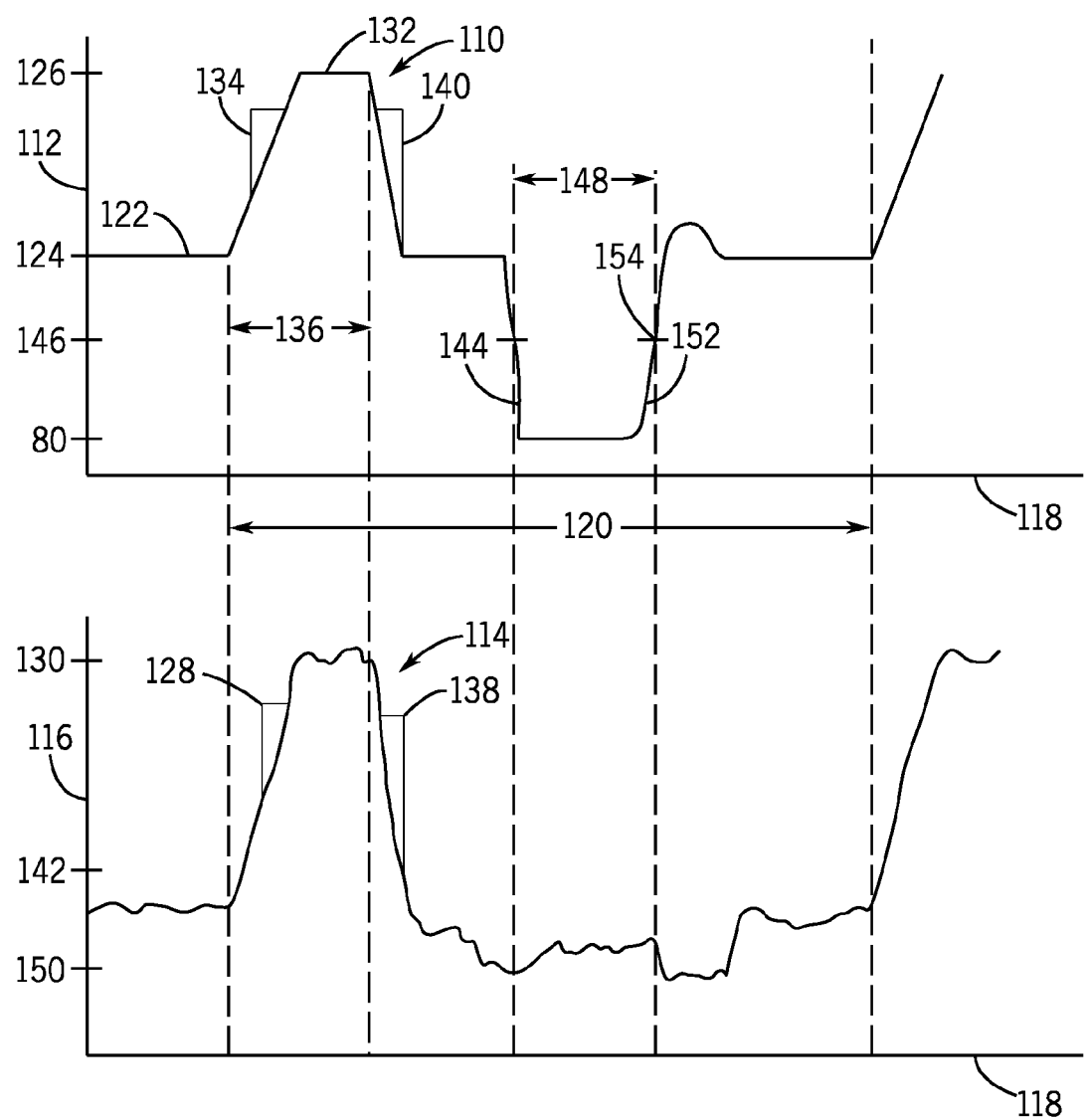
FIG. 4 is an embodiment of a voltage and current waveform of a GMAW system.

FIG. 4 illustrates an exemplary voltage waveform 110 with voltage axis 112 and current waveform 114 with current axis 116, both across time axis 118, as implemented by control circuitry 22 of the power supply 10. The control circuitry 22 controls the power conversion circuitry 24 to supply the voltage and current waveforms 110, 114 to the electrode 80 at the contact point 84. The voltage waveform 110 may include segments of constant voltage, while current waveform 114 may include segments which allow the weld current to vary during corresponding constant voltage segments and segments which ramp current up or down at substantially constant rates as controlled by the power conversion circuitry 24. The pulsed waveforms may repeat at a predetermined or set frequency with a period 120.

Referring to voltage waveform 110, first constant voltage segment 122 represents a first background phase, during which background voltage level 124 is held constant. On current waveform 114, the corresponding weld current during the first background phase is allowed to vary so as to maintain the background voltage level 124. In the exemplary voltage waveform 110, background voltage level 124 is low enough such that short circuits may not occur during the first constant voltage segment 122, and is high enough to preheat the end portion 88 of the electrode 80 to form a molten ball of electrode material before the voltage increase of a subsequent pulse. Accordingly, in various embodiments the background voltage level 124 ranges from approximately 17V to 20V, but depending on variables such as frequency, wire feed speed (WFS), peak voltage level 126, choice of electrode 80, etc., the background voltage 124 may be higher or lower.

Immediately following the first constant voltage segment 122, the first background phase ends and a peak phase 136 begins. The power conversion circuitry 24 increases the weld current at a peak current ramp up rate 128 to a peak current level 130. Once the weld current reaches the peak current level 130, the power conversion circuitry 24 increases the voltage to reach peak voltage level 126 during segment 132, rising at a voltage ramp up rate 134. The voltage ramp up rate 134 may not be commanded, but rather results from the commanded peak current ramp up rate 128 of the current waveform 114 and the resistance of the electrode 80. The voltage may remain at peak voltage level 126 until the peak phase 136 expires. During segment 132, the weld current 114 may fluctuate while the voltage 110 remains constant until the peak phase 136 expires. The peak voltage level 126, the peak phase 136, the peak current ramp up rate 128, and the initial peak current level 130 may be chosen so as to control $l_{arc}$ 96 and $V_{arc}$ while substantially initializing the transfer of molten electrode material toward the weld puddle.

A second background phase begins immediately after the peak phase 136 expires. The weld current 114 decreases at a current ramp down rate 138, causing a reduction in the voltage waveform 110 at a voltage ramp down rate 140 until a background weld current level 142 is reached. To maximize the precision of the voltage and weld current pulse, the current ramp down rate 138 may be significantly faster than the peak current ramp up rate 128. In one embodiment, current ramp down rate 138 is 2000 A/ms, double the peak current ramp up rate 128 of 1000 A/ms. As during the first background phase, the voltage is then maintained at background voltage level 124 while the weld current varies for the duration of the second background phase.

The molten electrode material may reach the weld puddle while still attached to the tip of electrode 80, causing a short circuit and briefly extinguishing the arc 78. The short circuit may be detected at the point that voltage drop 144 crosses threshold voltage 146, triggering the end of the second background phase and the beginning of the restrike phase 148. During the restrike phase 148, current may be temporarily held constant at approximately a restrike current level 150 to allow the short circuit to clear. The restrike current level 150 may be high enough to keep the molten electrode material substantially fluid while it transfers to the weld puddle. It should be noted that as the molten electrode material detaches from the end portion 88 of the electrode 80 and the short circuit begins to clear, a voltage increase 152 naturally occurs; the arc restrike 154 occurs approximately at the point the voltage crosses the threshold voltage 146 and the control circuitry 22 detects that the short circuit has cleared. The control circuitry 22 may control the weld current 114 to approximately the background current level 142, and may control the voltage 110 to approximately the background voltage level 124 until the end of the period 120.

The control circuitry 22 controls the arc length 96 ($l_{arc}$) during a pulsed arc, waveform as shown in FIG. 4 based at least in part on calculations from measurements of the pulsed waveform (e.g., the voltage waveform 110 and the weld current waveform 114). For times t during the pulsed waveform, the weld voltage ($V_{weld}$) may be determined from Equation (2):

$$V_{weld}(I(t)) = R_{EE} * I(t) + (V_{anode} + V_{arc} + V_{cathode}) \quad \text{Equation (2)}$$

where $R_{EE}$ is the resistance of the electrode 80. $V_{weld}(I(t))$ and $I(t)$ may be known values to the control circuitry 22 via direct measurement from sensors and/or control of the power conversion circuitry 24.

As discussed above, the $V_{arc}$ may be directly related to (e.g., a function of) the arc length 96 (e.g., $V_{arc} = V_{arc}(l_{arc})$). Accordingly, Equation 2 may be rewritten as Equation (3):

$$V_{weld}((t)) = R_{EE} * I(t) + \lambda \quad \text{Equation (3)}$$

where $\lambda$ is defined by Equation (4):

$$\lambda = V_{fall} + V_{arc}(l_{arc}) \quad \text{Equation (4)}$$

Figure 5:
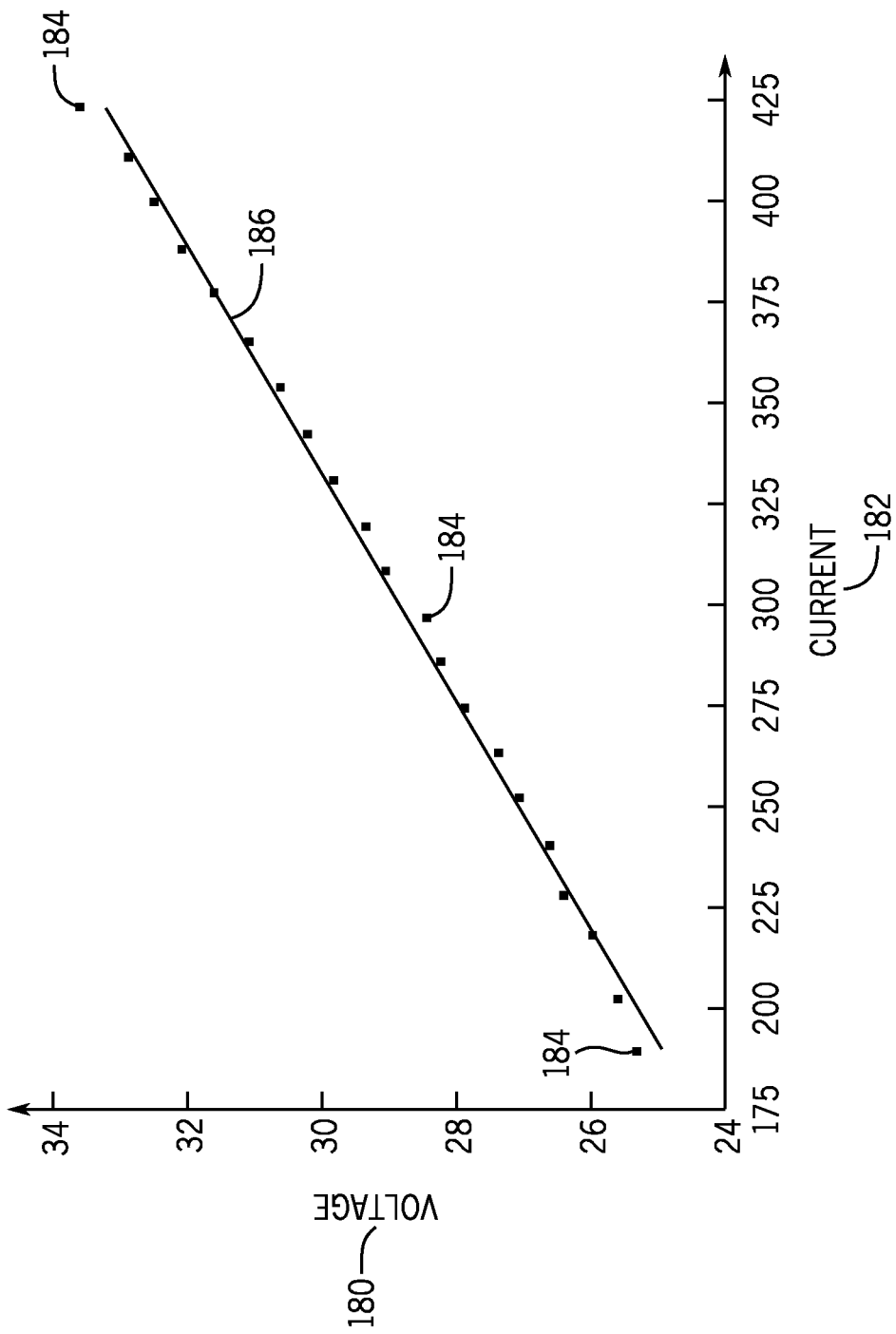
FIG. 5 is a graphical representation of sampled voltages and currents of a changing portion of a pulse waveform of a GMAW system.

The weld voltage and the weld current during the ramp up of the peak phase 136 or the ramp down from the peak phase 136 may be utilized to determine the electrode resistance $R_{EE}$. As shown in FIG. 5, the control circuitry 22 may sample the weld current 182 and corresponding weld voltage 180 when the pulsed waveform changes (e.g., during a ramp up to the peak phase 136 or ramp down from the peak phase 136). In other embodiments, the control circuitry 22 may sample only two points 184 of the current 180 and the corresponding voltages 182. Utilizing the point-slope formula, the control circuitry 22 may determine $R_{EE}$ from Equation (5):

$$R_{EE} = (V_2 - V_1)/(I_2 - I_1) \quad \text{Equation (5)}$$

where $I_1$ and $V_1$ are first values of a weld current and a corresponding voltage during the ramp up to the peak current and voltage levels (e.g., levels 130 and 126 respectively), and $I_2$ and $V_2$ are second values of a weld current and a corresponding voltage during the ramp up to the peak current and voltage levels. In some embodiments, $I_1$ and $V_1$ are first values of a current and a corresponding voltage during the ramp down from the peak current and voltage levels, and $I_2$ and $V_2$ are second values of a weld current and a corresponding voltage during the ramp down from the peak current and voltage levels. In some embodiments, the first and second values may be sampled points 184 or interpolated values between sampled points 184.

In some embodiments, the control circuitry 22 may sample three or more points 184 of the current 180 and the corresponding voltages 182, as shown in FIG. 5. The control circuitry 22 may determine a regression line 186 or other approximation that provides a functional relationship between multiple sampled weld current values and corresponding voltage values. The control circuitry 22 may utilize the functional relationship to determine $R_{EE}$. For example, FIG. 5 illustrates the weld current 180 and the voltage 182 during the ramp up of the peak phase in an embodiment with a 0.045 inch mild steel electrode fed at 300 inches per minute, with a 0.8 inch contact tip to work distance (CTWD). The corresponding regression line 186 in this example may be defined by Equation (6):

$$V_{weld} = 18.27V + 0.03521 * I_{weld} \quad \text{Equation (6)}$$

where $R_{EE}$ is determined to be 0.03521Ω. Utilizing Equations (3) and $R_{EE}$ determined from Equation (5) or the functional relationship (e.g., Equation (6)), the control circuitry 22 may determine a value for $\lambda$, as shown in Equation (7):

$$\lambda = V_1 - R_{EE} * I_1 \quad \text{Equation (7)}$$

Figure 6:
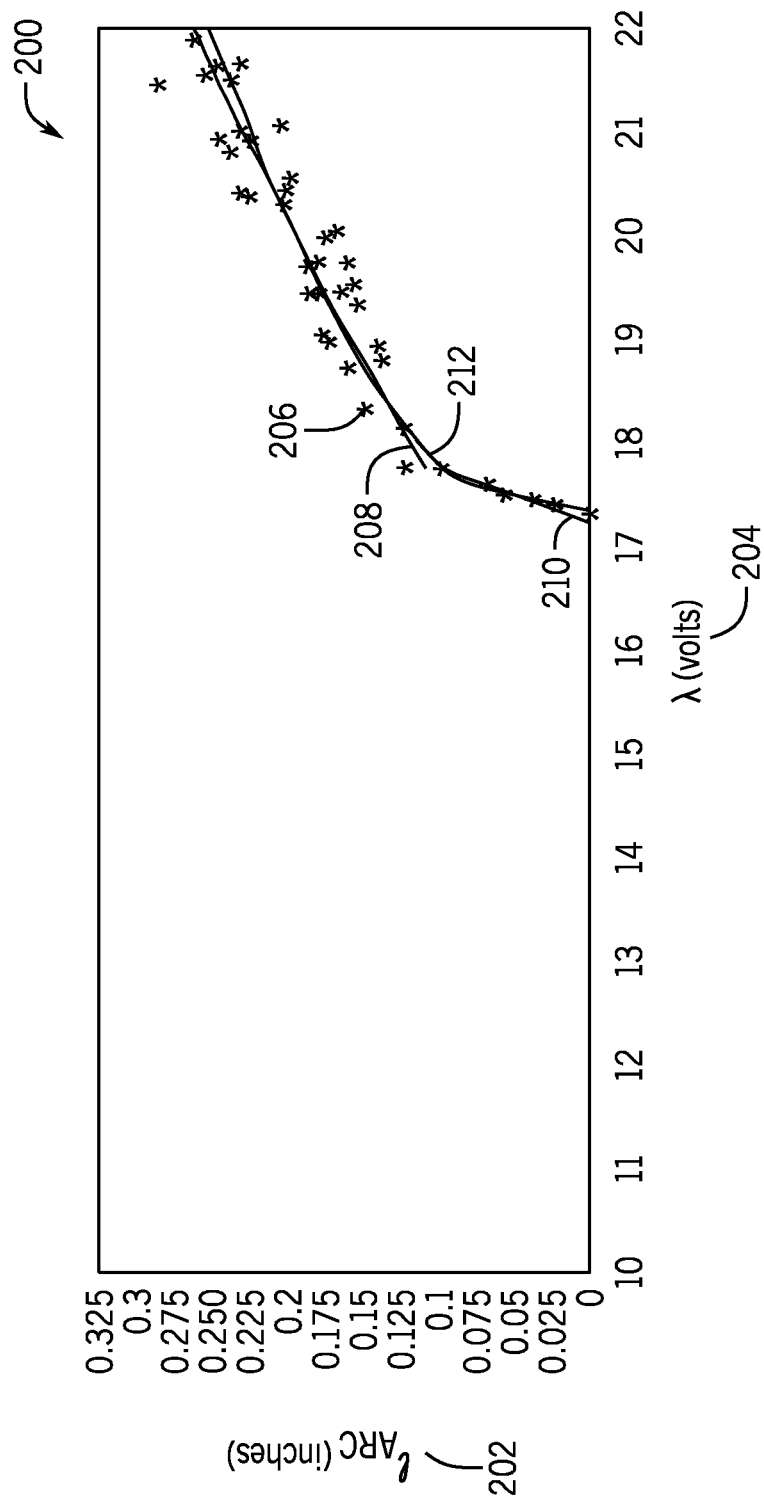
FIG. 6 is a graphical representation of a relationship between arc length and $\lambda$, in accordance with an embodiment.

The control circuitry 22 determines the arc length ($l_{arc}$) from $\lambda$ based at least in part on data loaded from memory circuitry 66. The memory circuitry 66 may include a database with data populated from one or more tests and calibrations that provide corresponding relationships between $\lambda$ and $l_{arc}$ for various combinations of the arc parameters. As discussed herein, arc parameters may include, but are not limited to, electrode type, electrode material, electrode size, electrode extension, wire feed rates, shielding gas composition, torch type, CTWD, pulse frequency, and so forth. A chart 200 of FIG. 6 illustrates arc length ($l_{arc}$) 202 corresponding to $\lambda$ values 204 for various combinations of arc parameters. For each chart or set of data points 206, the arc parameters may be divided into control arc parameters, which are maintained substantially constant for a data set, and variable arc parameters, which are adjusted for the data set. For example, chart 200 of FIG. 6 illustrates data points 206 from a sample set in which the control arc parameters are the electrode type, electrode material, electrode size, and shielding gas, and variable arc parameters include one or both of the electrode extension and the wire feed speed. In some embodiments, the data points 206 are obtained through visual measurement (e.g., via video) of the arc length 202 during test or calibration welds in which the variable arc parameters are adjusted. As may be appreciated, the visual measurements of the arc length 202 correspond to $\lambda$ values 204, and the $\lambda$ values 204 may be determined as discussed above with FIG. 5 and Equations (3) through (7).

The values for arc length ($l_{arc}$) 202 and $\lambda$ 204 for a set of arc parameters (e.g., control arc parameters, variable arc parameters) may have a functional relationship. In some embodiments, the functional relationship may be a piece-wise relationship in which a first portion of the data points 206 may be modeled with a first function, and a second portion of the data points 206 may be modeled with a different second function. For example, the data points 206 corresponding to arc lengths ($l_{arc}$) 202 greater than approximately 0.1 inch may be modeled with a first regression model 208, and the data points 206 corresponding to arc lengths ($l_{arc}$) 202 less than approximately 0.1 inch may be modeled with a second regression model 210. Two or more functional relationships may be utilized to model the relationship for a set of data points 206. Moreover, as may be appreciated, models for each of the piece-wise relationships may include, but are not limited to a linear model, a polynomial model, a logarithmic model, and an exponential model. In some embodiments, the functional relationship for all the data points 206 of a set may be modeled with a polynomial model 212 (e.g., third order, fourth order, or fifth order, or more) or via interpolation between tabular data points.

The chart 200 may be used to determine the components of $\lambda$ 204 (e.g., $V_{fall}$ and $V_{arc}$) for the set of control arc parameters. $V_{arc}$ is directly related to $l_{arc}$ such that when $l_{arc}$ is approximately equal to zero inches, $V_{arc}$ is approximately equal to zero volts. Accordingly, utilizing Equation (4) and the chart 200 and/or functional relationship, $V_{fall}$ may be approximated as the voltage value 204 where the $l_{arc}$ value 202 is approximately equal to zero (e.g., the intercept of $l_{arc}$ and the voltage value 204). $V_{fall}$ may be substantially constant over the set of data points 206 with the maintained control arc parameters and adjusted variable arc parameters, thereby enabling the determination of $V_{arc}$, and thus the determination of $l_{arc}$ for the set of arc parameters.

The memory circuitry 66 may include the data of multiple charts 200 for various data sets and combinations of arc parameters. In some embodiments, the control circuitry 22 may utilize one or more data sets to estimate (e.g., via interpolation) $V_{fall}$, $V_{arc}$, and $l_{arc}$. For example, data sets corresponding to control arc parameters with an electrode size (e.g., 0.045 inch diameter) with a shielding gas composition (e.g., 90% argon, 15% $CO_2$) may be utilized to estimate $V_{fall}$, $V_{arc}$, and $l_{arc}$ for control arc parameters with a differently sized electrode (e.g., 0.05 inch diameter) and/or a different shielding gas composition (e.g., 85% argon, 15% $CO_2$). Testing or calibration data utilized to determine $V_{fall}$, $V_{arc}$, and $l_{arc}$ may be manually input to the memory circuitry 66 (e.g., via operator interface 20), or loaded via an input/output device (e.g., network, external memory).

Figure 7:
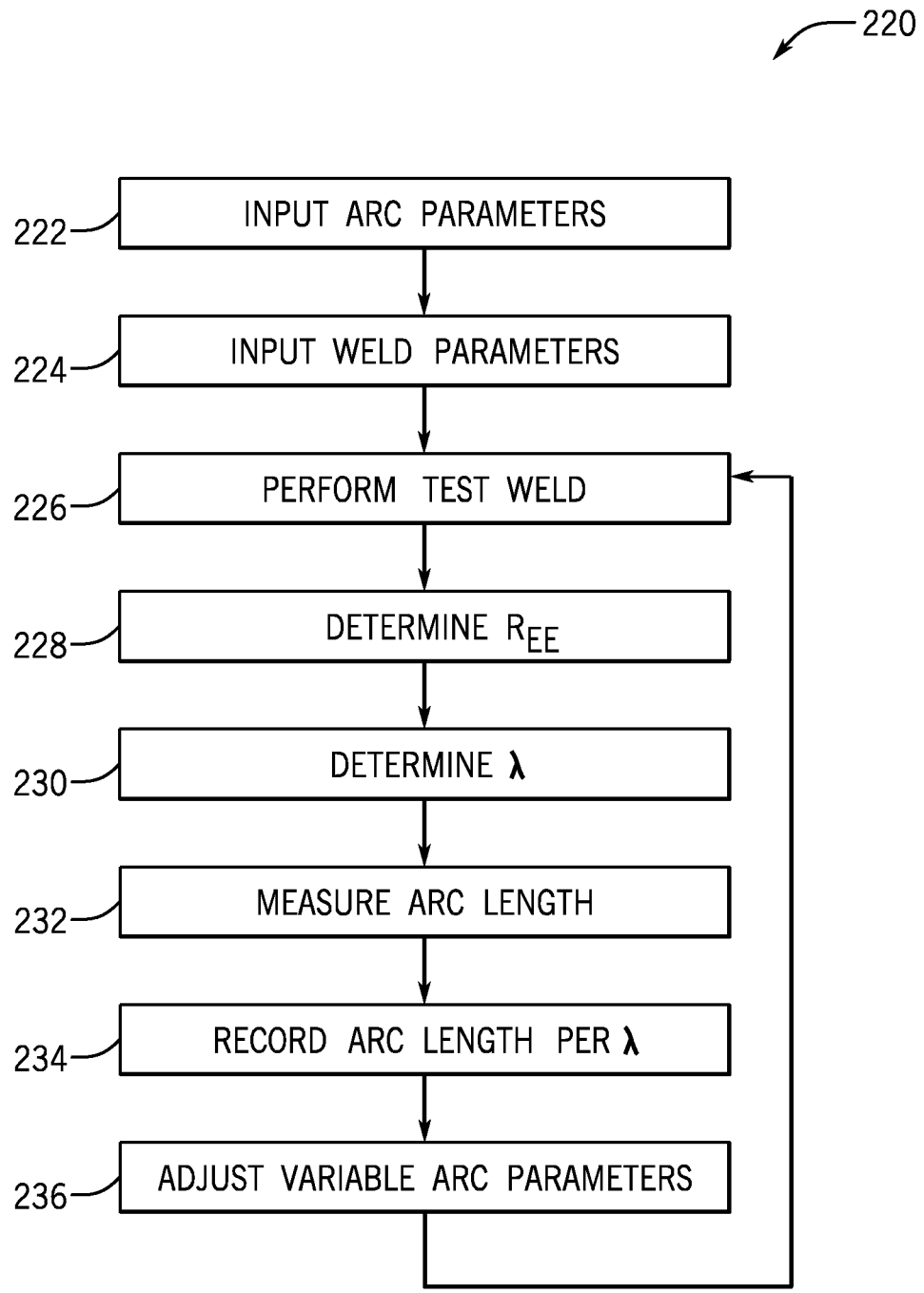
FIG. 7 is a flow chart illustrating a method to obtain a data set relating arc length and $\lambda$, in accordance with an embodiment.

FIG. 7 illustrates a flow chart describing a method 220 to obtain data points 206 for a data set or chart 200 to store in memory circuitry 66. At the beginning of the method 220, the operator inputs (block 222) arc parameters into an operator interface. In some embodiments, the inputs may be received at the power supply or a separate testing controller (e.g., test terminal) coupled to the power supply. The arc parameters may include control arc parameters that are substantially maintained during a data set, and variable arc parameters that are adjusted for various welds of the data set. For example, the control arc parameters may include, but are not limited to, the electrode type (e.g., solid, cored, hollow), the electrode material (e.g., steel, aluminum), the electrode geometry (e.g., diameter), the shielding gas composition (e.g., argon, $CO_2$, hydrogen, oxygen), and workpiece parameters (e.g., workpiece materials, joint type). The variable arc parameters may include, but are not limited to, the wire feed rate, the electrode extension, the CTWD, and the shielding gas supply rate. The operator inputs (block 224) system parameters regarding the supplied pulsed waveform into the operator interface, such as via the power supply operator interface. The system parameters may include, but are not limited to the background and peak currents and voltages, the pulse frequency, the peak pulse duration, and so forth.

After the arc and system parameters for the data set are input, the operator may perform (block 226) a test weld. The test weld may include one or more pulsed waveforms that deposit one or more droplets to a weld pool. During the test weld, the control circuitry monitors the weld current and the weld voltage while the weld current and the weld voltage are changing (e.g., ramp up, ramp down). The control circuitry determines (block 228) $R_{EE}$ based at least in part on a regression model of the observed weld current and weld voltage or the point-slope formula with the observed weld current and weld voltage, as discussed above. $R_{EE}$ may be determined from observed increasing or decreasing weld current and weld voltage values. Utilizing $R_{EE}$, the observed weld current and weld voltage, and Equation (3), the control circuitry determines (block 230) the sum of $V_{fall}$ and $V_{arc}$ as a value of λ. The arc length ($l_{arc}$) of the test weld is measured (block 232), such as via a high speed video. In some embodiments, video of the test weld is later processed with the observed weld current and weld voltage, and the arc length is measured after completion of the test weld. Once the arc length is measured, $l_{arc}$ and corresponding λ are recorded (block 234) as a data point 206 in the data set. In some embodiments, the operator adjusts (block 236) one or more of the variable arc parameters prior to returning to block 226 to perform the next test weld. Additionally, or in the alternative, the control circuitry or test controller (e.g., computer) coupled to the power supply may adjust the variable arc parameters based at least in part on a set of instructions to obtain a desired data set of arc lengths for various values of λ without stopping the test weld. In other words, the control circuitry may execute data set acquisition instructions to automatically adjust the variable arc parameters to populate a data set. As may be appreciated, the steps in blocks 228, 230, 232, and 234 may be performed by the control circuitry of the power supply and/or a test controller. In some embodiments, method 220 may be performed for multiple combinations of arc parameters to populate a database that may be loaded into memory circuitry 66 prior to use at a work site.

Figure 8:
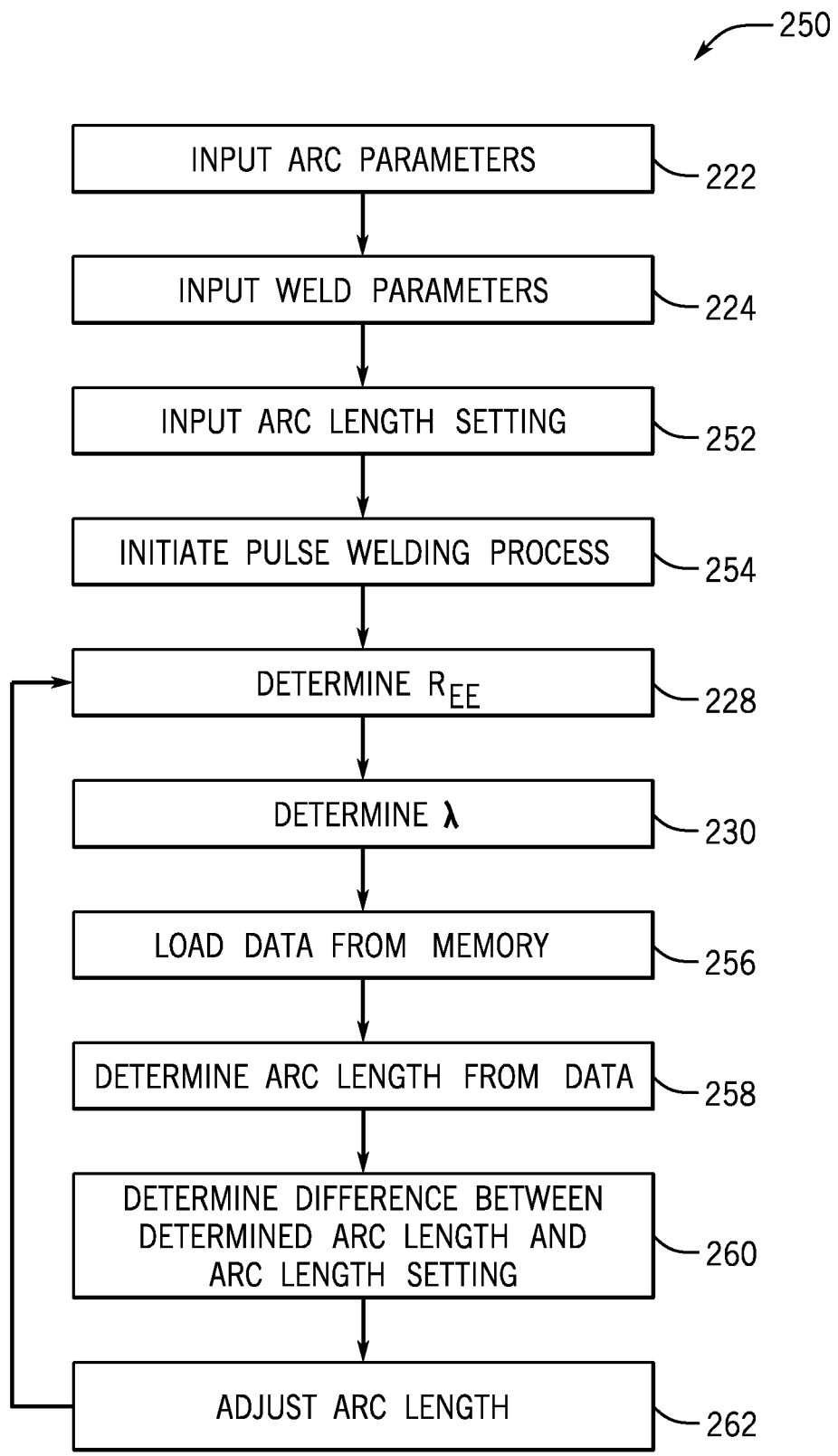
FIG. 8 is a flow chart illustrating a method to determine and control arc length of a pulse waveform.

FIG. 8 illustrates a method 250 of utilizing the data to determine and control arc length during a GMAW process (e.g., short circuit, globular, spray, pulse). The operator inputs (block 222) arc parameters and inputs (block 224) system parameters into an operator interface of the power supply and/or the wire feeder. The operator also inputs (block 252) an arc length setting to the operator interface. As may be appreciated, the arc length may be associated with the heat input to the electrode and the workpiece, as well as the weld quality and transfer of the electrode to the workpiece. The operator may initiate (block 254) the welding process that supplies pulsed waveforms to the torch.

Similar to method 220 discussed above, the control circuitry monitors the weld current and the weld voltage for changes (e.g., increases or decreases) to the power supplied during the welding process. The control circuitry determines (block 228) $R_{EE}$ based at least in part on a regression model of the observed weld current and weld voltage or the point-slope formula with the observed weld current and weld voltage during the changes (e.g., ramp up or ramp down). Utilizing $R_{EE}$, the observed weld current and weld voltage during the change, and Equation (3), the control circuitry determines (block 230) the sum of $V_{fall}$ and $V_{arc}$ as a value of λ. The control circuitry loads (block 256) data from the memory circuitry that relates to the input arc parameters and input system parameters. In some embodiments, the control circuitry loads (block 256) data from the memory circuitry prior to initiating (block 254) the welding process. As may be appreciated, the data loaded from the memory circuitry may be generated via method 220 of FIG. 7.

Utilizing one or more data sets loaded from the memory circuitry, the control circuitry determines (block 258) the arc length from the functional relationship between λ and $l_{arc}$. In some embodiments, the functional relationship between λ and $l_{arc}$ is a piece-wise function with different functions based on the λ value. In some embodiments, the functional relationship between λ and $l_{arc}$ is a polynomial function (e.g., third order). Upon determination of arc length from λ, the control circuitry determines (block 260) a difference between the determined arc length from block 258, and the arc length setting from block 252. The control circuitry controls (block 262) the power supply and/or the wire feeder in a closed-loop control to adjust the arc length based at least in part on the arc length difference. For example, the control circuitry may control the power conversion circuitry and/or the wire feeder to adjust one or more of the current waveform (e.g., background current, peak current, peak duration, ramp up rate, ramp down rate), the voltage waveform (e.g., background voltage, peak voltage, peak duration, ramp up rate, ramp down rate), the pulse frequency, the pulse period, the electrode extension, and the wire feed rate, thereby adjusting the arc length of the present pulsed waveform or a subsequent pulse waveform.

The control circuitry determines and controls the arc length in a closed-loop control system. In some embodiments, the control circuitry may perform steps 228, 230, 256, 258, 260, and 262 within a pulse period, thereby enabling the control circuitry to control the arc length of each pulsed waveform supplied to the torch. For example, the control circuitry may monitor the weld current and weld voltage of a first pulse waveform in a series of pulse waveforms, determine the arc length at the beginning of the peak phase of the first pulse waveform, and control the arc length of the first pulse waveform before the end of the first pulse waveform. In some embodiments, the control circuitry may utilize the arc length from the first pulsed waveform (e.g., waveform n) to control the arc length of a subsequent pulsed waveform (e.g., waveform n+1, n+2, n+3, n+ . . . , etc).

In some embodiments, the control circuitry described above enables the arc length to be controlled independently of the electrode extension. Control of the arc length independent of the electrode extension may enable the operator to form welds with a desired arc length in relatively deep joints. In some embodiments, the control circuitry may determine wear on the contact point of the torch based at least in part on changes to the arc length. For example, a worn contact point transferring the pulsed waveform to the electrode may partially fuse to the electrode and halt or slow the feed of the electrode toward the workpiece. This partial fusion may change the arc length by one or more droplet diameters (e.g., threshold difference) from a first pulsed waveform to a second pulsed waveform. Accordingly, determination of this change in arc length may indicate a worn contact point of the torch. The control circuitry may notify the operator (e.g., via an alert signal) of a worn contact point via the operator interface.

In some embodiments, the control circuitry may determine electrode extension and/or CTWD based at least in part on the determined resistance of the electrode as described above in Equation (5). For example, the control circuitry may determine the electrode extension through a functional relationship (e.g., Ω/mm for a known electrode diameter) between the electrode extension and the electrode resistance. Through comparison of the determined resistance during a first pulsed waveform with subsequent pulsed waveforms, the control circuitry may determine the extent and/or type of wear to the contact point of the torch. The control circuitry may utilize statistical analysis to compare the determined resistance for multiple pulsed waveforms and make determinations of electrode extension, CTWD, or contact tip wear, or any combination thereof. In some embodiments, the control circuitry may determine penetration of the electrode or weld pool through the workpiece based at least in part on the determined resistance, electrode extension, or CTWD. For example, an increased resistance while maintaining a substantially constant CTWD may indicate the electrode extension is increasing and the weld pool is penetrating the workpiece. Accordingly, the control circuitry may monitor the resistance as an indicator for penetration.

In summary, the control circuitry monitors the pulse waveform for a change (e.g., increase or decrease) in the current and/or the voltage, which may indicate the beginning of a peak phase, end of the peak phase, or other change. Upon observation of a change in the current and/or the voltage, the control circuitry may determine $R_{EE}$ from a regression model or the point-slope formula utilizing sampled current and voltage values from the change. Upon determination of $R_{EE}$, the control circuitry determines the λ value utilizing Equation (3) and the sampled voltage and the sampled current values. In some embodiments, the control circuitry may control the pulse waveform to adjust the arc length based on the λ alone. Adjustments based on λ alone enable the control circuitry to compensate for changes in $V_{EE}$ (e.g., due to electrode extensions) while adjusting $V_{Fall}$ and $V_{arc}$. Additionally, or in the alternative, the control circuitry may determine $l_{arc}$ from λ and one or more data sets loaded from the memory circuitry, which are related at least in part to the arc parameters of the present weld. In a closed-loop control based at least in part on the determination of $l_{arc}$, the control circuitry may control the power supply and/or the power feeder to adjust $V_{arc}$ and the corresponding $l_{arc}$ of the present pulsed waveform and/or the subsequent pulsed waveform of the present weld.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. Method of controlling a welding system comprising:
   controlling, via control circuitry of the welding system, a weld current supplied to an electrode at a current ramp rate over a time segment; and
   determining, via the control circuitry, an arc length based at least in part on the controlled weld current and a changing arc voltage during the time segment, wherein the arc length comprises a distance between the electrode and a workpiece, the changing arc voltage comprises a voltage between the electrode and the workpiece, and the arc length is determined without altering the weld current for measurement purposes.

2. The method of claim 1, comprising:
   sensing, via one or more sensors coupled to the control circuitry, the controlled weld current and the changing arc voltage during the time segment; and
   controlling one or more weld parameters of the welding system based at least in part on the determined arc length.

3. The method of claim 2, comprising
   sensing, via the one or more sensors, the controlled weld current and the changing arc voltage during a ramp up of a first pulse; and
   controlling, via the control circuitry, the one or more weld parameters during a second pulse subsequent to the first pulse, wherein the one or more weld parameters comprises the arc length, a wire feed speed, or an electrode extension, or any combination thereof.

4. The method of claim 1, wherein determining the arc length comprises:
   determining, via the control circuitry, a resistance of the electrode based at least in part on the controlled weld current and the changing arc voltage during the time segment;
   determining, via the control circuitry, the changing arc voltage based at least in part on a weld voltage, the resistance, and a fall voltage; and determining, via the control circuitry, the arc length based at least in part on a functional relationship between the arc length and the arc voltage.

5. The method of claim 4, comprising:
receiving, via an operator interface, an electrode parameter input and a shielding gas input; and
loading the functional relationship from a memory based at least in part on the electrode parameter input and the shielding gas input.

6. The method of claim 2, wherein controlling the one or more weld parameters comprises maintaining the arc length within a threshold length of a desired arc length throughout a first pulse.

7. The method of claim 1, comprising:
determining, via the control circuitry, a resistance of the electrode based at least in part on the controlled weld current and the changing arc voltage during the time segment; and
determining, via the control circuitry, an electrode extension based at least in part on a functional relationship between the resistance and the electrode extension.

8. A welding system comprising:
power conversion circuitry configured to provide a pulse welding waveform to a torch, wherein the pulse welding waveform comprises a peak portion, and the peak portion comprises a ramp up portion or a ramp down portion;
one or more sensors configured to sense a weld voltage of the pulse welding waveform and a weld current of the pulse welding waveform applied to an electrode within the torch; and
processing circuitry coupled to the one or more sensors, wherein the processing circuitry is configured to determine an arc length based at least in part on changes to the weld current and changes to the weld voltage during the ramp up portion or the ramp down portion, wherein the arc length comprises a distance between the electrode and a workpiece, and the processing circuitry is configured to determine the arc length based at least in part on upward slopes of the weld current and the weld voltage during the ramp up portion, downward slopes of the weld current and the weld voltage during the ramp down portion, an upward regression model of the weld current and the weld voltage during the ramp up portion, or a downward regression model of the weld current and the weld voltage during the ramp down portion.

9. The welding system of claim 8, wherein the processing circuitry is configured to control the peak portion of the pulse welding waveform based at least in part on the arc length.

10. The welding system of claim 8, wherein the processing circuitry comprises a memory, and the processing circuitry is configured to determine the arc length based at least in part on a functional relationship between an arc voltage and the arc length, wherein the functional relationship is stored in the memory, and the arc voltage comprises a voltage between the electrode and the workpiece.

11. The welding system of claim 8, wherein the processing circuitry is configured to control the power conversion circuitry to maintain the arc length within a threshold length of a desired arc length throughout the pulse welding waveform.

12. The welding system of claim 11, comprising an operator indicator coupled to the processing circuitry, wherein the processing circuitry is configured to transmit an alert signal to the operator indicator if the determined arc length is greater than the threshold length.

13. The welding system of claim 8, wherein the processing circuitry is configured to control the arc length based at least in part on a fall voltage and an arc voltage between the electrode and the workpiece.

14. The welding system of claim 13, wherein the fall voltage is based at least in part on a material of the electrode, a shielding gas provided to the torch, or any combination thereof.

15. The welding system of claim 8, wherein the processing circuitry is configured to control one or more welding parameters based at least in part on the determined arc length, wherein the welding parameter comprises a wire feed speed, an electrode extension, or any combination thereof.

16. The welding system of claim 8, wherein the processing circuitry is configured to determine an electrode resistance based at least in part on the upward slopes, the downward slopes, the upward regression model, or the downward regression model, and the processing circuitry is configured to determine the arc length based at least in part on the electrode resistance.

17. Method of controlling a welding system comprising:
sensing, via one or more sensors, a changing weld current and a changing voltage of a pulse welding waveform, wherein the changing weld current and the changing voltage occur during a ramp up portion or a ramp down portion of a pulse of the pulse welding waveform;
determining, via control circuitry coupled to the one or more sensors, a resistance of an electrode based at least in part on upward slopes of the changing weld current and the changing voltage during the ramp up portion, downward slopes of the changing weld current and the changing voltage during the ramp down portion, an upward regression model of the changing weld current and the changing voltage during the ramp up portion, or a downward regression model of the changing weld current and the changing voltage during the ramp down portion;
determining, via the control circuitry, an arc voltage based at least in part on a weld voltage, the resistance, and a fall voltage; and
controlling, via the control circuitry, an arc length during the pulse welding waveform based at least in part on a functional relationship between the arc length and the arc voltage, wherein the arc length comprises a distance between the electrode and a workpiece.

18. The method of claim 17, comprising:
receiving a threshold length; and
maintaining the arc length within the threshold length of a desired arc length throughout the pulse welding waveform.

19. The method of claim 17, wherein the functional relationship is based at least in part on a material of the electrode and a shielding gas provided by a torch.

* * * * *